US011878349B2

(12) United States Patent
Praharaj et al.

(10) Patent No.: US 11,878,349 B2
(45) Date of Patent: Jan. 23, 2024

(54) METAL DROP EJECTING THREE-DIMENSIONAL (3D) OBJECT PRINTER AND METHOD OF OPERATION FOR FORMING METAL SUPPORT STRUCTURES

(71) Applicant: Xerox Corporation, Norwalk, CT (US)

(72) Inventors: Seemit Praharaj, Webster, NY (US); Douglas K. Herrmann, Webster, NY (US); Thomas J. Wyble, Williamson, NY (US); Jason M. LeFevre, Penfield, NY (US); Chu-Heng Liu, Penfield, NY (US); Paul J. McConville, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 134 days.

(21) Appl. No.: 17/393,115

(22) Filed: Aug. 3, 2021

(65) Prior Publication Data

US 2023/0037539 A1 Feb. 9, 2023

(51) Int. Cl.
| | |
|---|---|
| *B22F 12/50* | (2021.01) |
| *B33Y 10/00* | (2015.01) |
| *B33Y 30/00* | (2015.01) |
| *B33Y 40/00* | (2020.01) |
| *B33Y 50/02* | (2015.01) |
| *B22D 23/00* | (2006.01) |
| *B22F 10/22* | (2021.01) |
| *B22F 10/85* | (2021.01) |

(52) U.S. Cl.
CPC ............ *B22F 12/50* (2021.01); *B22D 23/003* (2013.01); *B22F 10/22* (2021.01); *B22F 10/85* (2021.01); *B33Y 10/00* (2014.12); *B33Y 30/00* (2014.12); *B33Y 40/00* (2014.12); *B33Y 50/02* (2014.12)

(58) Field of Classification Search
None
See application file for complete search history.

(56) References Cited

U.S. PATENT DOCUMENTS

| | | | |
|---|---|---|---|
| 9,616,494 B2 | 4/2017 | Vader et al. | |
| 10,040,119 B2 | 8/2018 | Vader et al. | |
| 2015/0273577 A1* | 10/2015 | Vader ..................... | B22F 12/53 164/513 |

* cited by examiner

*Primary Examiner* — Anthony M Liang
(74) *Attorney, Agent, or Firm* — Maginot Moore & Beck LLP

(57) ABSTRACT

A three-dimensional (3D) metal object manufacturing apparatus is equipped with two solid metal moving mechanisms that are independently operated to move two different metals into the receptacle of a vessel in a melted metal drop ejecting apparatus. The ejector is operated to form object features with melted metal drops of one of the two different metals and to form support features with melted metal drops of the other of the two different metals. The thermal expansion coefficients of the two metals are sufficiently different that the support features easily separate from the object features after the object and support features cool.

11 Claims, 8 Drawing Sheets

METAL DROP EJECTING THREE-DIMENSIONAL (3D) OBJECT PRINTER AND METHOD OF OPERATION FOR FORMING METAL SUPPORT STRUCTURES

TECHNICAL FIELD

This disclosure is directed to three-dimensional (3D) object printers that eject melted metal drops to form objects and, more particularly, to the formation of metal support structures used to form objects with such printers.

BACKGROUND

Three-dimensional printing, also known as additive manufacturing, is a process of making a three-dimensional solid object from a digital model of virtually any shape. Many three-dimensional printing technologies use an additive process in which an additive manufacturing device forms successive layers of the part on top of previously deposited layers. Some of these technologies use ejectors that eject UV-curable materials, such as photopolymers or elastomers. The printer typically operates one or more extruders to form successive layers of the plastic material to construct a three-dimensional printed object with a variety of shapes and structures. After each layer of the three-dimensional printed object is formed, the plastic material is UV cured and hardens to bond the layer to an underlying layer of the three-dimensional printed object. This additive manufacturing method is distinguishable from traditional object-forming techniques, which mostly rely on the removal of material from a work piece by a subtractive process, such as cutting or drilling.

Recently, some 3D object printers have been developed that eject drops of melted metal from one or more ejectors to form 3D objects. These printers have a source of solid metal, such as a roll of wire or pellets, that is fed into a heated receptacle of a vessel in the printer where the solid metal is melted and the melted metal fills the receptacle. The receptacle is made of non-conductive material around which an electrical wire is wrapped to form a coil. An electrical current is passed through the coil to produce an electromagnetic field that causes the meniscus of the melted metal at a nozzle of the receptacle to separate from the melted metal within the receptacle and be propelled from the nozzle. A platform opposite the nozzle of the ejector is moved in a X-Y plane parallel to the plane of the platform by a controller operating actuators so the ejected metal drops form metal layers of an object on the platform and another actuator is operated by the controller to alter the position of the ejector or platform in the vertical or Z direction to maintain a constant distance between the ejector and an uppermost layer of the metal object being formed. This type of metal drop ejecting printer is also known as a magneto-hydrodynamic (MHD) printer.

In the 3D object printing systems that use elastomer materials, temporary support structures are formed by using an additional ejector to eject drops of a different material to form supports for overhang and other object features that extend away from the object during formation of the object. Because these support structures are made from materials that are different than the materials that form the object they do not adhere or bond well with the object. Consequently, they can be easily separated from the object feature that they supported during object manufacture and removed from the object after object formation is finished. Such is not the case with metal drop ejecting systems. If the melted metal in the printer is used to form support structures with the metal being ejected to form the object, then the structure bonds strongly with the features of the object that need support while they solidify. Consequently, a significant amount of machining and polishing is needed to remove the supports from the object. Damage to the object can occur during this post-manufacture processing. Coordinating another metal drop ejecting printer using a different metal is difficult because the thermal conditions for the different metal can affect the build environment of the object forming system. For example, a support structure metal having a higher melting temperature can weaken or soften the metal forming the object or a support metal structure having a lower melting temperature can weaken when the object feature contacts the structure. Being able to form support structures that enable metal drop ejecting printers to form metal object overhangs and other extending features would be beneficial.

SUMMARY

A new method of operating a 3D metal object printer forms support structures that do not adhere tightly to object features supported by the structures without adversely impacting the environment of the 3D metal object printer. The method includes operating a first solid metal feeding mechanism to move a first solid metal into a receptacle of a vessel in an ejector for melting, and operating a second solid metal feeding mechanism to move a second solid metal that is different than the first solid metal into the receptacle of the vessel in the ejector for melting.

A new 3D metal object printer forms support structures that do not adhere tightly to object features supported by the structures without adversely impacting the environment of the 3D metal object printer. The new 3D metal object printer includes an ejector having a vessel with a receptacle within the vessel, a heater configured to heat the vessel to a temperature sufficient to melt solid metal within the receptacle of the vessel, a first solid metal feeding mechanism configured to move a first solid metal into the receptacle of the vessel in the ejector for melting, and a second solid metal feeding mechanism configured to move a second solid metal that is different than the first solid metal into the receptacle of the vessel in the ejector for melting.

BRIEF DESCRIPTION OF THE DRAWINGS

The foregoing aspects and other features of a method for forms support structures that do not adhere tightly to object features supported by the structures without adversely impacting the environment of the 3D metal object printer and a 3D metal object printer that implements the method are explained in the following description, taken in connection with the accompanying drawings.

DETAILED DESCRIPTION

Figure 1:
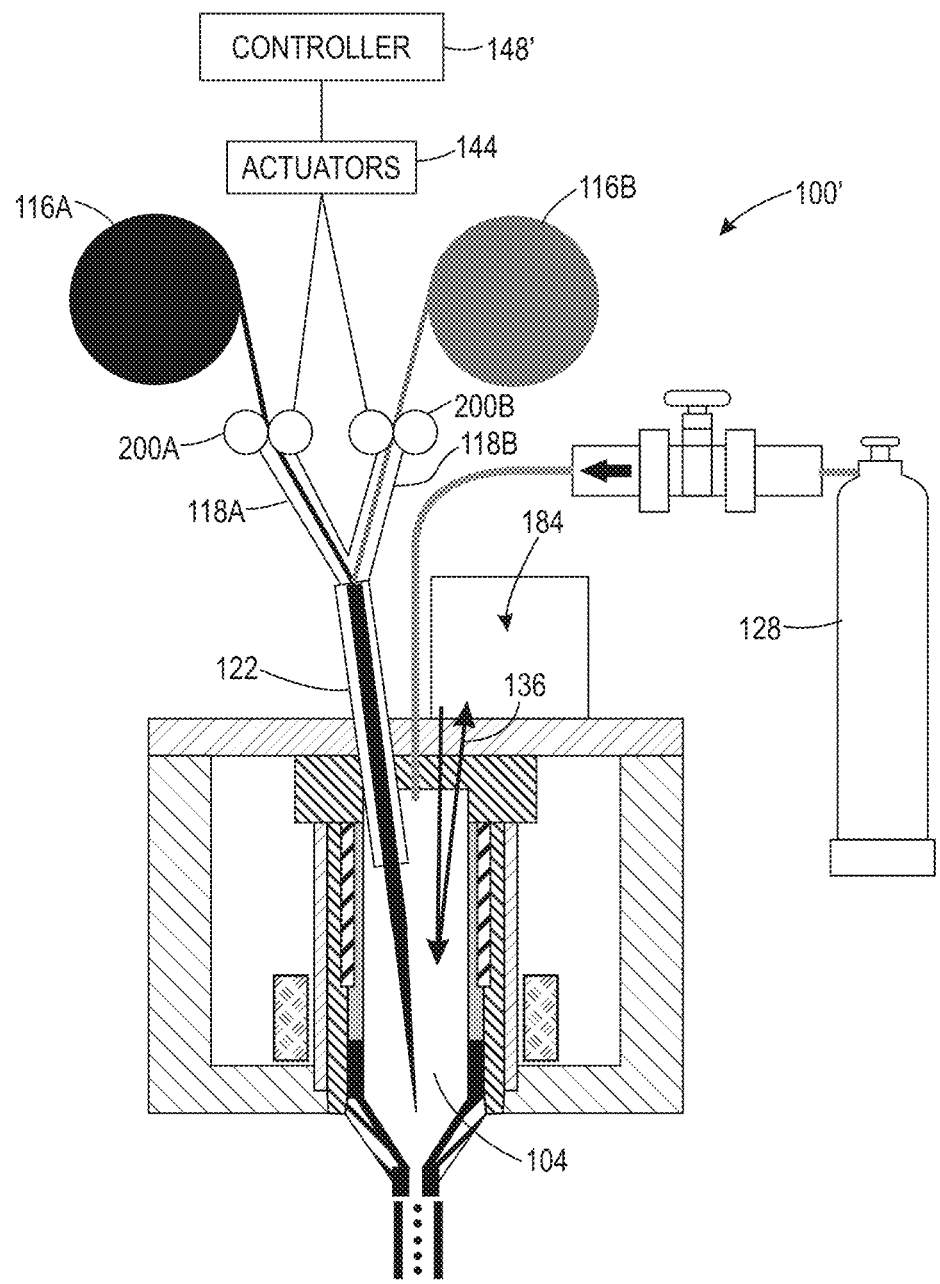
FIG. 1 depicts a new 3D metal object printer that forms support structures that do not adhere tightly to object features supported by the structures without adversely impacting the environment of the 3D metal object printer.

For a general understanding of the environment for the 3D metal object printer and its operation as disclosed herein as well as the details for the printer and its operation, reference is made to the drawings. In the drawings, like reference numerals designate like elements.

Figure 5:
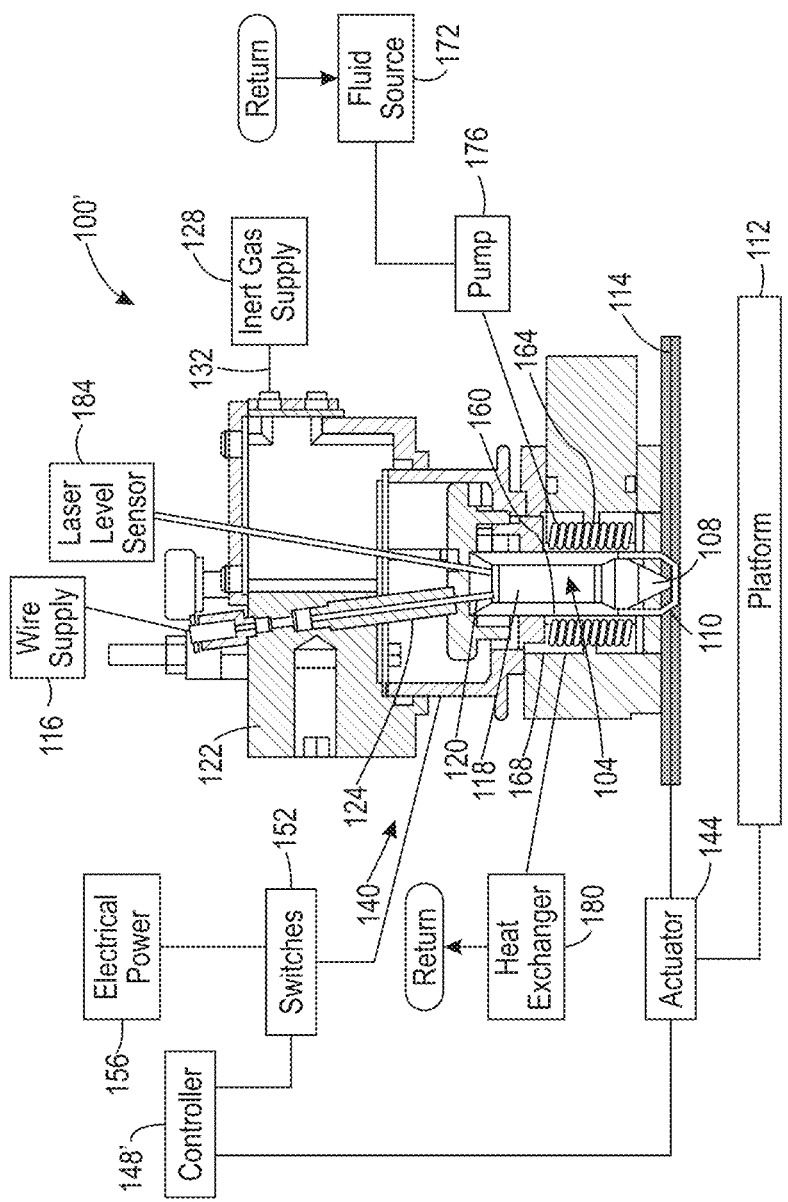
FIG. 5 is a schematic diagram of a prior art 3D metal printer that does not include components for forming support structures made with a different metal alloy.

FIG. 5 illustrates an embodiment of a previously known 3D metal object printer 100 that ejects drops of a single melted metal to form an object without using support structures. In the printer of FIG. 5, drops of melted bulk metal are ejected from a receptacle of a removable vessel 104 having a single nozzle 108 and drops from the nozzle form swaths for layers of an object on a platform 112. As used in this document, the term "removable vessel" means a hollow container having a receptacle configured to hold a liquid or solid substance and the container as a whole is configured for installation and removal in a 3D metal object printer. As used in this document, the term "vessel" means a hollow container having a receptacle configured to hold a liquid or solid substance that may be configured for installation and removal from a 3D object metal printer. As used in this document, the term "bulk metal" means conductive metal available in aggregate form, such as wire of a commonly available gauge or pellets of macro-sized proportions.

With further reference to FIG. 5, a source of bulk metal 116, such as metal wire 120, is fed into a wire guide 124 that extends through the upper housing 122 in the ejector head 140 and melted in the receptacle of the removable vessel 104 to provide melted metal for ejection from the nozzle 108 through an orifice 110 in a baseplate 114 of the ejector head 140. As used in this document, the term "nozzle" means an orifice fluidically connected to a volume within a receptacle of a vessel containing melted metal that is configured for the expulsion of melted metal drops from the receptacle within the vessel. As used in this document, the term "ejector head" means the housing and components of a 3D metal object printer that melt, eject, and regulate the ejection of melted metal drops for the production of metal objects. A melted metal level sensor 184 includes a laser and a reflective sensor. The reflection of the laser off the melted metal level is detected by the reflective sensor, which generates a signal indicative of the distance to the melted metal level. The controller receives this signal and determines the level of the volume of melted metal in the removable vessel 104 so it can be maintained at the upper level 118 in the receptacle of the removable vessel. The removable vessel 104 slides into the heater 160 so the inside diameter of the heater contacts the removable vessel and can heat solid metal within the receptacle of the removable vessel to a temperature sufficient to melt the solid metal. As used in this document, the term "solid metal" means a metal as defined by the periodic chart of elements or alloys formed with these metals in solid rather than liquid or gaseous form. The heater is separated from the removable vessel to form a volume between the heater and the removable vessel 104. An inert gas supply 128 provides a pressure regulated source of an inert gas, such as argon, to the ejector head through a gas supply tube 132. The gas flows through the volume between the heater and the removable vessel and exits the ejector head around the nozzle 108 and the orifice 110 in the baseplate 114. This flow of inert gas proximate to the nozzle insulates the ejected drops of melted metal from the ambient air at the baseplate 114 to prevent the formation of metal oxide during the flight of the ejected drops. A gap between the nozzle and the surface on which an ejected metal drop lands is intentionally kept small enough that the inert gas exiting around the nozzle does not dissipate before the drop within this inert gas flow lands.

The ejector head 140 is movably mounted within Z-axis tracks for vertical movement of the ejector head with respect to the platform 112. One or more actuators 144 are operatively connected to the ejector head 140 to move the ejector head along a Z-axis and are operatively connected to the platform 112 to move the platform in an X-Y plane beneath the ejector head 140. The actuators 144 are operated by a controller 148 to maintain an appropriate distance between the orifice 110 in the baseplate 114 of the ejector head 140 and an uppermost surface of an object on the platform 112.

Moving the platform 112 in the X-Y plane as drops of molten metal are ejected toward the platform 112 forms a swath of melted metal drops on the object being formed. Controller 148 also operates actuators 144 to adjust the vertical distance between the ejector head 140 and the most recently formed layer on the substrate to facilitate formation of other structures on the object. While the molten metal 3D object printer 100 is depicted in FIG. 5 as being operated in a vertical orientation, other alternative orientations can be employed. Also, while the embodiment shown in FIG. 5 has a platform that moves in an X-Y plane and the ejector head moves along the Z axis, other arrangements are possible. For example, the actuators 144 can be configured to move the ejector head 140 in the X-Y plane and along the Z axis or they can be configured to move the platform 112 in both the X-Y plane and Z-axis.

A controller 148 operates the switches 152. One switch 152 can be selectively operated by the controller to provide electrical power from source 156 to the heater 160, while another switch 152 can be selectively operated by the controller to provide electrical power from another electrical source 156 to the coil 164 for generation of the electrical field that ejects a drop from the nozzle 108. Because the heater 160 generates a great deal of heat at high temperatures, the coil 164 is positioned within a chamber 168 formed by one (circular) or more walls (rectilinear shapes) of the ejector head 140. As used in this document, the term "chamber" means a volume contained within one or more walls within a metal drop ejecting printer in which a heater, a coil, and a removable vessel of a 3D metal object printer are located. The removable vessel 104 and the heater 160 are located within such a chamber. The chamber is fluidically connected to a fluid source 172 through a pump 176 and also fluidically connected to a heat exchanger 180. As used in this document, the term "fluid source" refers to a container of a liquid having properties useful for absorbing heat. The heat exchanger 180 is connected through a return to the fluid source 172. Fluid from the source 172 flows through the chamber to absorb heat from the coil 164 and the fluid carries the absorbed heat through the exchanger 180, where the heat is removed by known methods. The cooled fluid is returned to the fluid source 172 for further use in maintaining the temperature of the coil in an appropriate operational range.

The controller 148 of the 3D metal object printer 100 requires data from external sources to control the printer for metal object manufacture. In general, a three-dimensional model or other digital data model of the object to be formed is stored in a memory operatively connected to the controller 148. The controller can selectively access the digital data model through a server or the like, a remote database in which the digital data model is stored, or a computer-readable medium in which the digital data model is stored. This three-dimensional model or other digital data model is processed by a slicer implemented with the controller to generate machine-ready instructions for execution by the controller 148 in a known manner to operate the components of the printer 100 and form the metal object corresponding to the model. The generation of the machine-ready instructions can include the production of intermediate models, such as when a CAD model of the device is converted into an STL data model, a polygonal mesh, or other intermediate representation, which in turn can be processed to generate machine instructions, such as g-code, for fabrication of the object by the printer. As used in this document, the term "machine-ready instructions" means computer language commands that are executed by a computer, microprocessor, or controller to operate components of a 3D metal object additive manufacturing system to form metal objects on the platform 112. The controller 148 executes the machine-ready instructions to control the ejection of the melted metal drops from the nozzle 108, the positioning of the platform 112, as well as maintaining the distance between the orifice 110 and the uppermost layer of the object on the platform 112.

Using like reference numbers for like components, a new 3D metal object printer 100' is shown in FIG. 1. The controller 148' has been configured with programmed instructions stored in a non-transitory media operatively connected to the controller that, when executed by the controller, cause the controller to detect layers of metal support structures in the model data and to generate machine-ready instructions that operate one or more of the actuators 144 to feed a support metal alloy from supply 116B into the removable vessel 104 to change the composition of the melted metal in the vessel so subsequent metal drop ejections from the nozzle 108 form a metal support structure. After all or a portion of metal support structure is formed, the controller 148' subsequently detects machine-ready instructions for forming object layers and operates one or more of the actuators 144 to feed a build metal alloy from supply 116A into the removable vessel 104 to change the composition of the melted metal in the vessel so subsequent metal drop ejections from the nozzle 108 form object structure. This alteration between object structure formation and support structure formation continues until the object is completed. Thereafter, the metal support structures formed with the different metal alloy can be separated from the object without machining.

In more detail, printer 100' includes two metal supplies 116A and 166B, which as depicted are wire spools, although the supplies can be volumes of metal powder or metal pellets. The wire from the two supplies 116A and 116B are independently and respectively provided to two wire feed mechanisms 200A and 200B, which are described in more detail below. These mechanisms are connected to one or more actuators to provide motive power for the rollers in the mechanisms to push wire through the wire guides 118A and 118B, respectively. Both of these wire guides direct wire into a common wire guide 122, which feeds the wire into the vessel 104 for melting.

Figure 2:
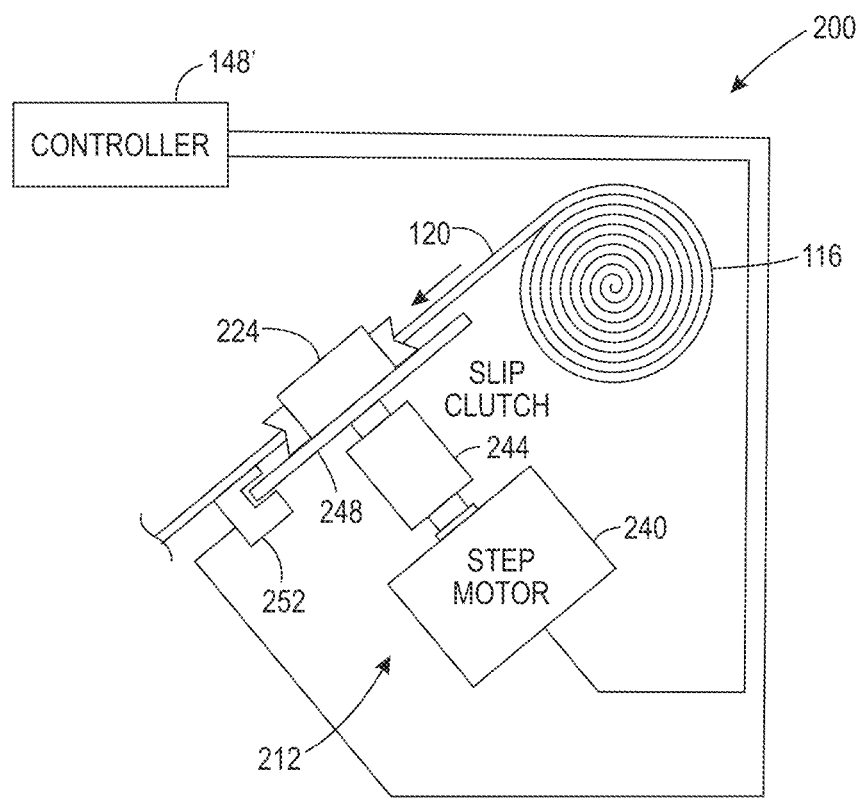
FIG. 2 is a schematic diagram of a wire feeding mechanism used to provide wire to the wire guide 124 in FIG. 1 and that measures wire retracted from the receptacle of the vessel of the printer in FIG. 1.

A mechanism 200A for feeding wire from wire supply 116A through the wire guide 118A to the vessel 104 is shown in FIG. 2. The mechanism 200A is one embodiment used for mechanism 200A and 200B to dispense wire into the vessel. The controller 148' is operatively connected to an actuator, such as stepper motor 240, to control the rate at which the wire is delivered from supply 116A to the vessel 104. The actuator 240 drives the roller 224 and is operatively connected to the controller 148' so the controller can regulate the speed at which the actuator drives the roller 224. Another roller opposite roller 224 is free-wheeling so it follows the rate of rotation at which roller 224 is driven.

A slip clutch 244 is operatively connected to the drive shaft of actuator 240 that feeds wire to the vessel. As used in this document, the term "slip clutch" refers to a device that applies frictional force to an object to move the object up to a predetermined set point. When the range about the predetermined set point for the frictional force is exceeded, the device slips so it no longer applies the frictional force to the object. The slip clutch enables the force exerted on the wire 120 by the roller 224 to remain within the constraints of the strength of the wire no matter how frequently, how fast, or how long the actuator 240 is driven. This constant force can be maintained by either driving the actuator 240 at a speed that is higher than the fastest expected rotational speed of the drive roller 224 or by putting an encoder wheel 248 on the roller 224 and sensing the rate of rotation with a sensor 252. The signal generated by the sensor 252 indicates the angular rotation of the roller 224 and the controller 148' uses this signal and the radius of the roller 224 to identify the length of wire fed from the wire supply 116A into the vessel 104. That is, the mechanisms 200A and 200B operate as a type of wire displacement sensor. Alternatively, the free-wheeling roller opposing the driven roller 224 can have an encoder 248 mounted to it to generate a signal indicative of its angular position so the length of metal wire fed by the mechanism can be determined. In a further alternative design, slip clutch 244 is omitted and the number of steps of motor travel that stepper motor 240 makes to feed a segment of wire into the receptacle is recorded and used to determine the length of linear wire travel.

The length of wire fed into the vessel 104 is used to determine the volume of melted metal added to the vessel 104. When a metal support structure layer is to be formed, the controller 148' operates an actuator 144 in the mechanism 200B to feed a length of wire into the vessel 104 sufficient to make the volume of melted metal in the vessel predominantly the alloy useful for forming metal support structures. When the controller 148' detects that a portion of an object layer is to be formed, the controller operates an actuator 144 in the mechanism 200A to feed a length of wire into the vessel 104 sufficient to make the volume of melted metal in the vessel predominantly the alloy useful for forming metal object structures.

The support structure metal of supply 116B is specifically chosen to have a coefficient of thermal expansion that is mismatched from the build metal of supply 116A. The mismatch in the coefficient of thermal expansion enables the support structures to contract at a different rate than the object structures when the object and supporting structures are cooled after object manufacture has completed. Depending on the integrity of the support structure, it either collapses or separates from the object structures so the support structures are easily removed from the object to produce the final part.

In one embodiment, the coefficients of thermal expansion for the common aluminum alloys used for object structures, such as Al 6061, Al 356, Al 7075, and Al 4043, is ~$13 \times 10^{-6}/°$ C. The metal/alloy for the metal support structures has a thermal expansion coefficient that is mismatched from the thermal expansion coefficient of the metal used for object structures in the temperature range from the highest melting point of the two metals to room temperature. The support structure metal is also compatible with the object structure metal by dissolving in the melted object structure metal within the vessel. These criteria identify the following metals as being suitable support structure materials for use with the aluminum object structure material noted previously: other aluminum alloys, magnesium, zinc, and alloys of magnesium and zinc. For metal object structures made with Al-7075, which has a thermal expansion coefficient of $\alpha = 12.9 \times 10^{-6}/°$ C., a useful metal support structure metal is Al-4032, which has a thermal expansion coefficient of $\alpha = \sim 1 \times 10^{-5}/°$ C. or Al-520, which has a thermal expansion coefficient of $\alpha = \sim 14 \times 10^{-6}/°$ C.

In one embodiment, when a transition is to be made from one metal to the other metal, the controller operates an actuator to move the ejector away from the object and then operate the ejector to expel an amount of the material currently being used that is approximately one and one-half the volume of the nozzle to ensure the next metal drops ejected are predominantly the metal object metal or the metal support metal. In order for the amount of melted metal in the vessel to correspond to the volume of the nozzle, the level of the melted metal in the vessel is kept at a low level that approximates the volume of the nozzle using the laser level sensor noted previously.

Figure 3A:
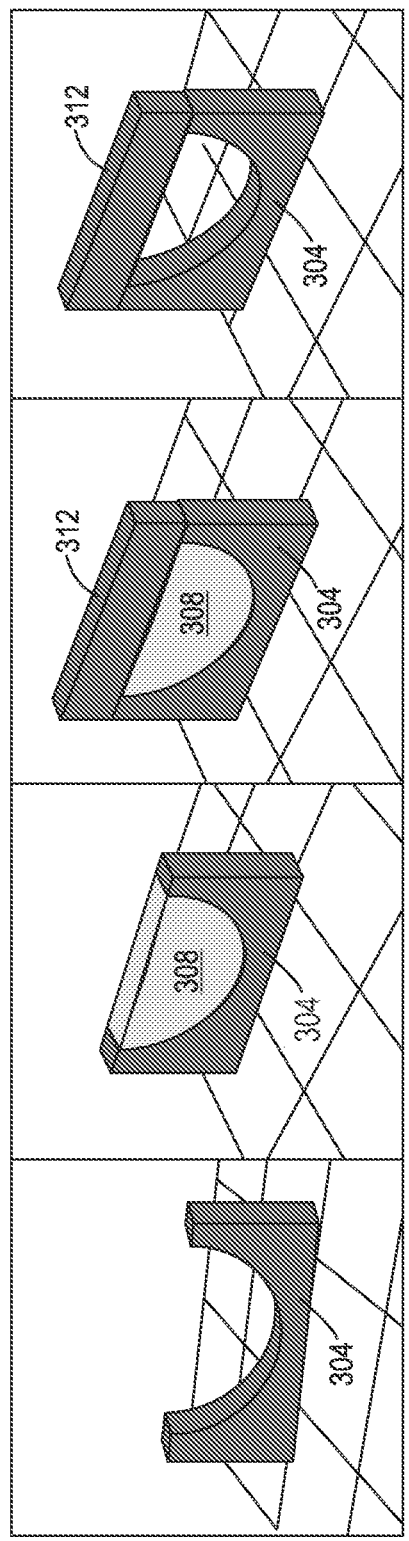
FIG. 3A is an illustration of the formation of a metal support structure that is used to form a metal overhang structure in the object and FIG. 3B shows the shrinkage of the metal support structure from the metal overhang structure during cooling of the object and support structure.

An example of the interleaved use of the two materials is shown in FIG. 3A. In the leftmost illustration, a U-shaped portion 304 of the object is formed using the metal from the object build material spool 116A. After the melted metal used for the formation of portion 304 is expelled from the vessel, an amount of support structure material corresponding to the support structure 308 is fed into the vessel and melted so the ejector can be operated to form the support structure in the U-shaped recess of portion 304. After the residual support material is expelled from the nozzle of the ejector, the object overhang 312 is formed over the support structure 308. As shown in the rightmost illustration of FIG. 3A, the support structure is removed so the object has an opening where the support structure was formed.

Figure 3B:
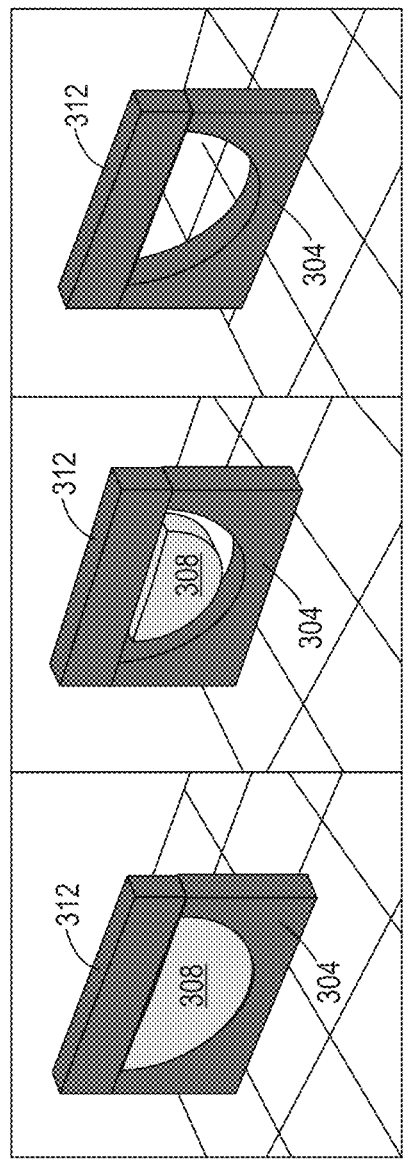

FIG. 3B shows the object portion 304 and the overhang 312 with the support structure 308. When object manufacture is complete, the composite object is cooled. The thermal expansion coefficient of the material used to form the support structure 308 enables it to shrink more than the object portion and overhang. Thus, the support structure separates from the object portion and overhang so it can be removed to formed the opening as shown in the rightmost illustration of FIG. 3B.

Figure 3C:
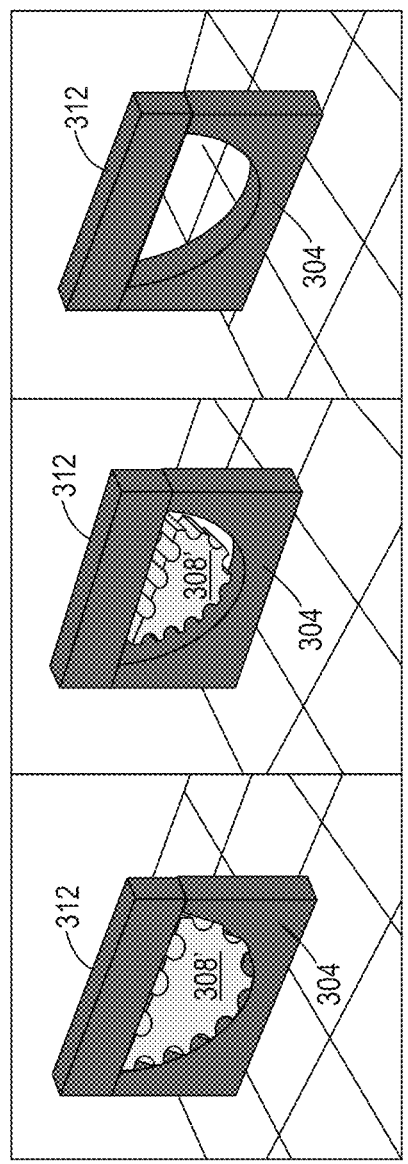
FIG. 3C shows formation of a support structure with a segmented boundary to facilitate removal of the support structure after the object manufacturing process is finished.

FIG. 3C shows an additional technique for facilitating removal of the support structure. Besides forming the support structure with material having the different thermal expansion coefficient, the support structure 308' is also formed with protuberances 316 to form a segmented boundary 320 between the body of the support structure 308' and the object portion 304 and the overhang 312. This segmented boundary 320 between the support structure 308' and the object portion 304 and the overhang 312 does not adhere to the object and overhang as tightly as the solid boundary shown in FIG. 3A and FIG. 3B. Thus, after the composite object is cooled, the support structure 308' can be removed from the object more easily than the support structures shown in FIG. 3A and FIG. 3B. In another embodiment, the support structure 308' is formed with the same material used to form the object portion 304 and the overhang 312. Still, the segmented boundary 320 facilitates separation of the support structure 308' from the object portion 304 and the overhang 312 even though they are made from the same material.

The controller 148' can be implemented with one or more general or specialized programmable processors that execute programmed instructions. The instructions and data required to perform the programmed functions can be stored in memory associated with the processors or controllers. The processors, their memories, and interface circuitry configure the controllers to perform the operations previously described as well as those described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits. During metal object formation, image data for a structure to be produced are sent to the processor or processors for controller 148' from either a scanning system or an online or work station connection for processing and generation of the signals that operate the components of the printer 100' to form an object on the platform 112.

Figure 4A:
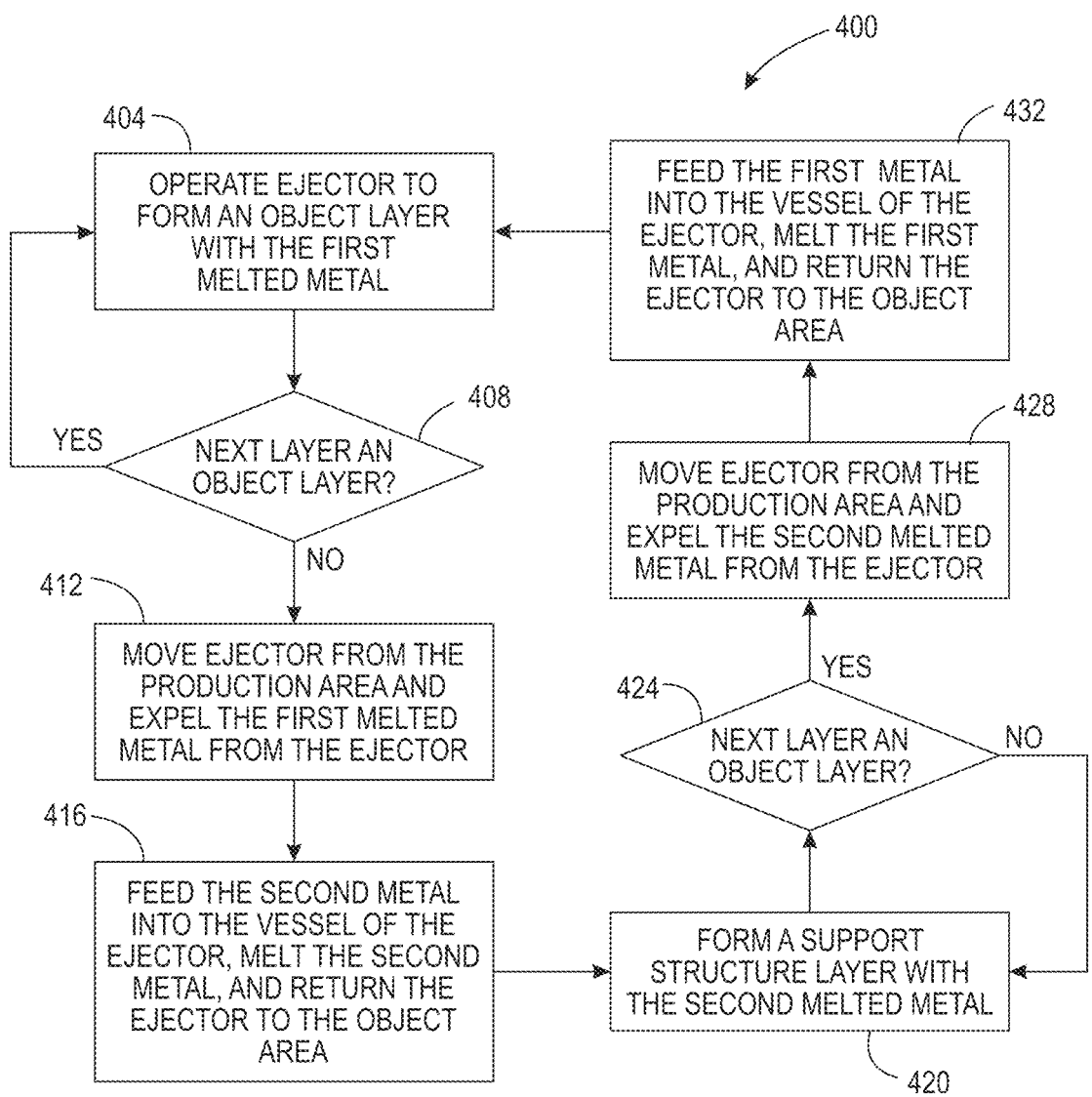
FIG. 4A is a flow diagram for a process that forms support structures that do not adhere tightly to object features supported by the structures without adversely impacting the environment of the 3D metal object printer.

A process for operating the 3D metal object printer 100' to form metal support structures with a melted metal that is different than the melted metal used to form object structures is shown in FIG. 4A. In the description of the process, statements that the process is performing some task or function refers to a controller or general purpose processor executing programmed instructions stored in non-transitory computer readable storage media operatively connected to the controller or processor to manipulate data or to operate one or more components in the printer to perform the task or function. The controller 148' noted above can be such a controller or processor. Alternatively, the controller can be implemented with more than one processor and associated circuitry and components, each of which is configured to form one or more tasks or functions described herein. Additionally, the steps of the method may be performed in any feasible chronological order, regardless of the order shown in the figures or the order in which the processing is described.

FIG. 4A is a flow diagram for a process 400 that operates the printer 100' to form support structures with melted metal that is different than the melted metal used to form portions of a metal object. The process begins with the formation of an object layer with a first melted metal (block 404). After the completion of each object layer, the process determines if the next layer to be formed is a support layer (block 408). If the next layer is not a support layer, the process continues forming object layers with the first metal (block 404). If the next layer is a support layer, the process moves the ejector to a position where the melted metal in the vessel can be expelled and the ejector is operated to expel the melted first metal from the ejector (block 412). An appropriate amount of the second metal for forming the structure layers is fed into the vessel, melted, and the ejector is returned to the object formation area for the production of a layer of a support structure with the melted second metal (block 416). A support structure layer is formed (block 420) and the process determines if the next layer to be formed is an object layer (block 424). If the next layer is a support layer, the process continues forming support layers with the second metal (block 420). If the next layer is an object layer, the process moves the ejector to a position where the melted second metal in the vessel can be expelled and the ejector is operated to expel the melted second metal from the ejector (block 428). An appropriate amount of the first metal is fed into the vessel, melted, and the ejector is returned to the object formation area (block 432). An object layer is formed (block 404) and the process continues until all of the object layers and support layers have been formed.

Figure 4B:
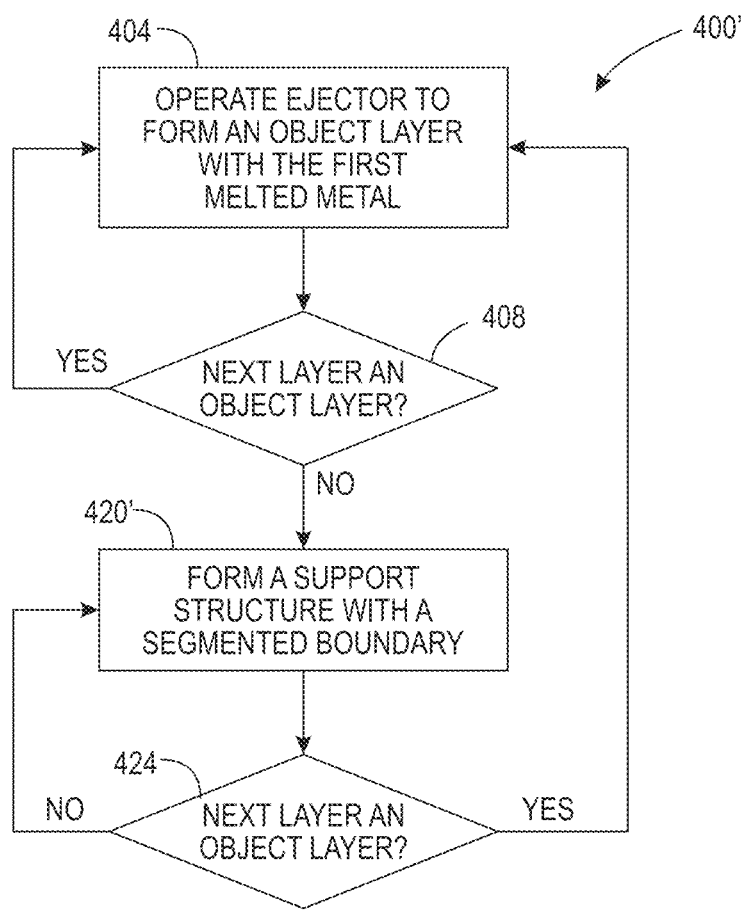
FIG. 4B is a flow diagram for a process that forms support structures with a segmented boundary so it does not adhere tightly to object features supported by the support structures.

FIG. 4B is a flow diagram for a process 400' that operates the printer 100' to form support structures with a segmented boundary to form portions of a metal object. Using like reference numbers to describe like processing, the process begins with the formation of an object layer with a first melted metal (block 404). After the completion of each object layer, the process determines if the next layer to be formed is a support layer (block 408). If the next layer is not a support layer, the process continues forming object layers with the first metal (block 404). If the next layer is a support layer, the process forms the support structure with a segmented boundary (block 420') until the process determines that the next layer to be formed is an object layer (block 424). If the next layer is a support layer, the process continues forming the support structure with the segmented boundary (block 420'). When the next layer is an object layer, the process continues forming object layers (block 404) until another support layer is to be formed (block 408). This process continues until all of the object layers and support layers have been formed.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A metal drop ejecting apparatus comprising:
    an ejector having a vessel with a receptacle within the vessel;
    a heater configured to heat the vessel to a temperature sufficient to melt solid metal within the receptacle of the vessel;
    a first solid metal feeding mechanism configured to move a first solid metal into the receptacle of the vessel in the ejector for melting;
    a second solid metal feeding mechanism configured to move a second solid metal that is different than the first solid metal into the receptacle of the vessel in the ejector for melting; and
    a controller operatively connected to the ejector, the heater, the first solid metal feeding mechanism, and the second solid metal feeding mechanism, the controller being configured to:
        operate the first solid metal feeding mechanism to feed the first solid metal into the receptacle of the vessel;
        operate the heater to melt the first solid metal in the vessel;
        operate the ejector to eject melted drops of the first solid metal to form layers of an object;
        operate the second solid metal feeding mechanism to feed the second solid metal into the receptacle of the vessel;
        operate the heater to melt the second solid metal in the vessel; and
        operate the ejector to eject melted drops of the second solid metal to form layers of a support structure.

2. The metal drop ejecting apparatus of claim 1, the controller being further configured to:
    operate the ejector to form layers of the support structure with a segmented boundary.

3. The metal drop ejecting apparatus of claim 1 further comprising:
    a first actuator configured to operate the first solid metal feeding mechanism to move the first solid metal into the receptacle of the vessel in the ejector;
    a second actuator configured to operate the second solid metal feeding mechanism to move the second solid metal into the receptacle of the vessel in the ejector; and
    the controller being operatively connected to the first actuator and the second actuator, the controller being further configured to:
        operate the first actuator and the second actuator independently to move either the first solid metal or the second solid metal into the receptacle of the vessel in the ejector.

4. The metal drop ejecting apparatus of claim 3 further comprising:
    a first roller operatively connected to the first actuator; and
    a second roller positioned to form a nip with the first roller; and
    the controller being further configured to:
        operate the first actuator to move a wire of the first solid metal into the receptacle of the vessel in the ejector.

5. The metal drop ejecting apparatus of claim 4 further comprising:
    a third roller operatively connected to the second actuator; and
    a fourth roller positioned to form a nip with the third roller; and
    the controller being further configured to:
        operate the second actuator to move a wire of the second solid metal into the receptacle of the vessel in the ejector.

6. The metal drop ejecting apparatus of claim 5, the controller being configured to identify a length of the first solid metal wire moved into the receptacle.

7. The metal drop ejecting apparatus of claim 6, the controller being configured to identify a length of the second solid metal wire moved into the receptacle.

8. The metal drop ejecting apparatus of claim 7 further comprising:
    a first encoder is configured to generate a signal indicative of a rate of angular movement of the first roller;
    a second encoder is configured to generate a signal indicative of a rate of angular movement of the third roller; and
    the controller is further configured to:
        identify the length of the first solid metal wire moved into the receptacle using the signal generated by the first encoder and a diameter of the first roller; and identify the length of the second solid metal wire moved into the receptacle using the signal generated by the second encoder and a diameter of the third roller.

9. The metal drop ejecting apparatus of claim 7 wherein the first actuator is a first stepper motor and the second actuator is a second stepper motor and the controller is further configured to:
- identify the length of the first solid metal wire moved into the receptacle using a number of motor turns made by the first stepper motor to feed a segment of the first solid metal wire into the receptacle; and
- identify the length of the second solid metal wire moved into the receptacle using a number of motor turns made by the second stepper motor to feed a segment of the second solid metal wire into the receptacle.

10. The metal drop ejecting apparatus of claim 7, the controller being further configured to:
- operate a third actuator operatively connected to the ejector to move the ejector to an area; and
- operate the ejector to expel melted first metal from the ejector before operating the second actuator to move second solid metal wire into the receptacle for melting.

11. The metal drop ejecting apparatus of claim 10 wherein the first solid metal wire has a thermal expansion coefficient that is different than a thermal expansion coefficient of the second solid metal wire.

* * * * *